April 24, 1956 R. W. DOTSON 2,743,118
TRAILER HITCHES
Filed July 2, 1953 2 Sheets-Sheet 2
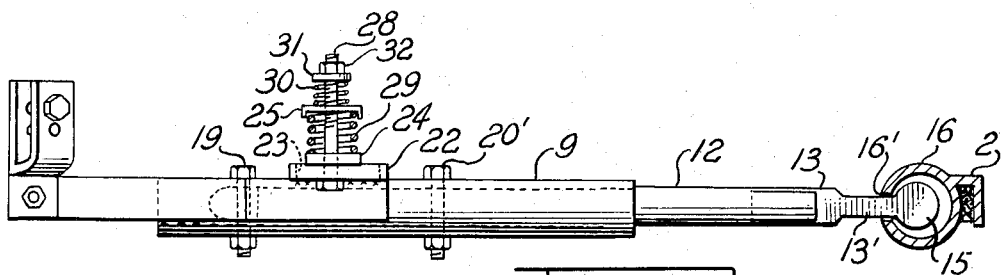
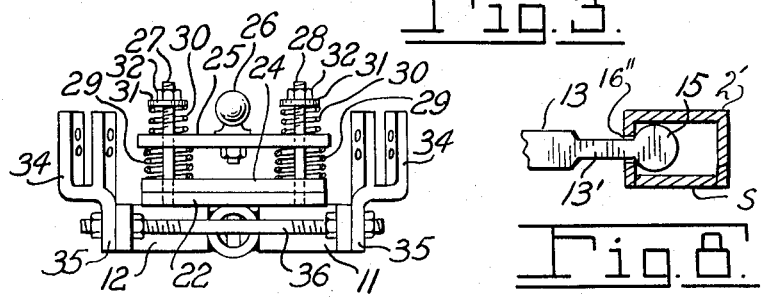
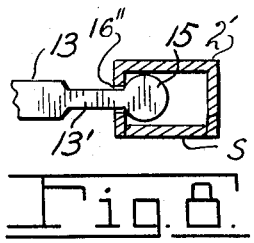
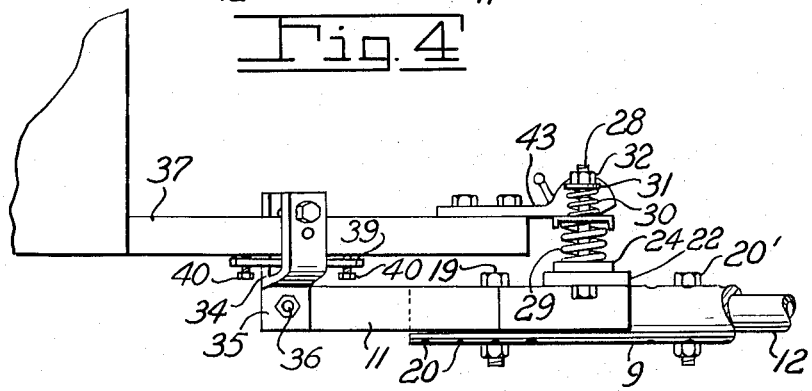
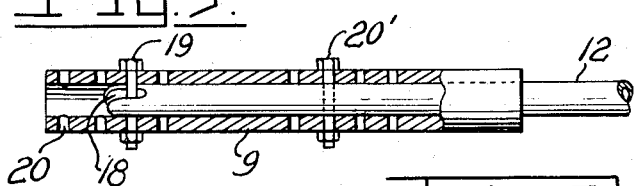
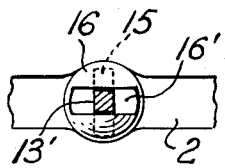
INVENTOR.
ROMAN W. DOTSON
BY
Zugelter & Zugelter
Attys.

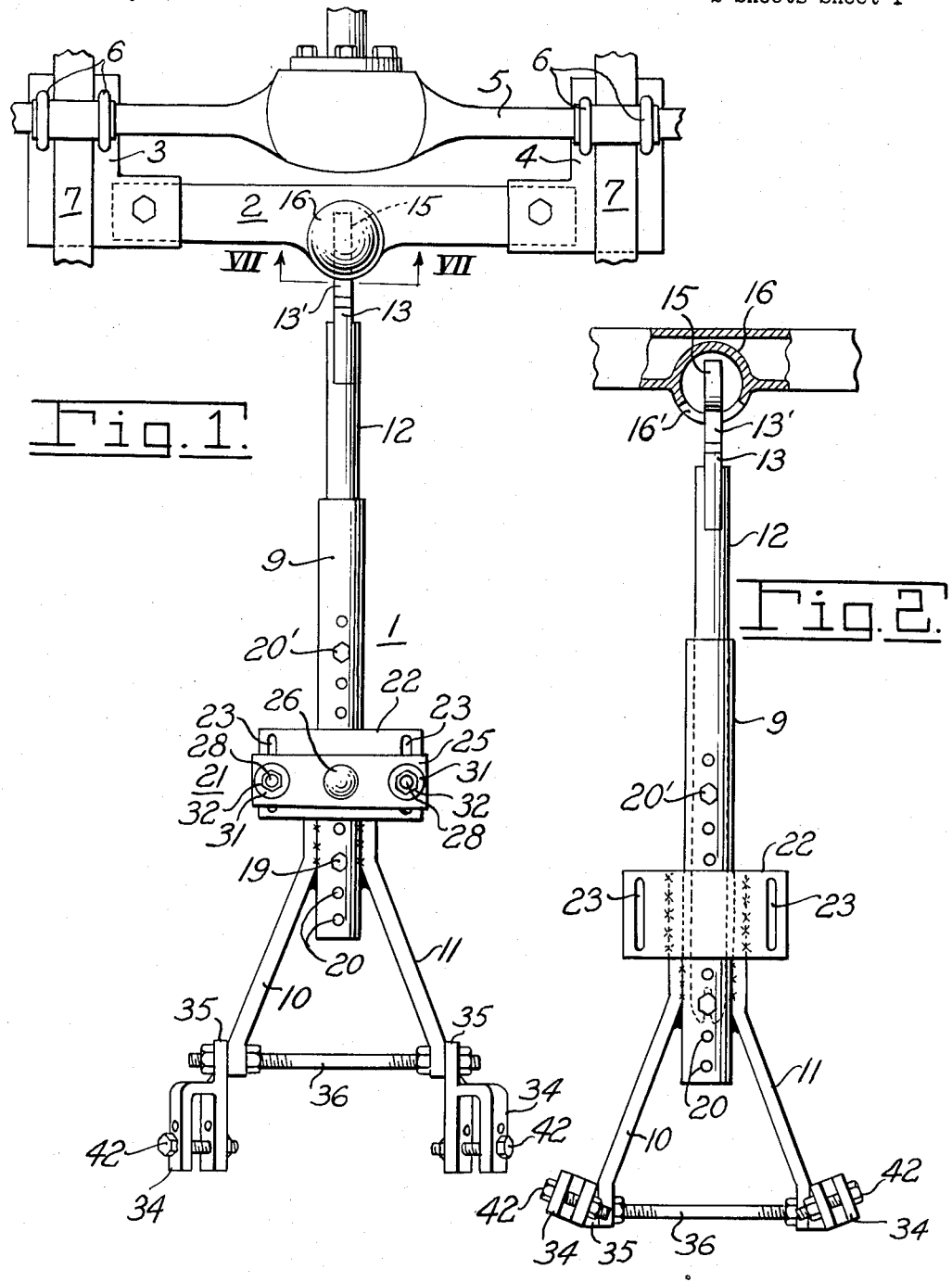

United States Patent Office 2,743,118
Patented Apr. 24, 1956

2,743,118

TRAILER HITCHES

Roman W. Dotson, Metropolis, Ill.

Application July 2, 1953, Serial No. 365,726

2 Claims. (Cl. 280—478)

This invention relates to trailer hitches for coupling a trailer to a motor vehicle.

An object of this invention is to provide a trailer hitch that is so constructed that the load of the trailer is carried by the rear axle of the vehicle instead of by the springs, as is the case with hitches heretofore constructed.

Another object of this invention is to provide a trailer hitch that is so constructed that the forward part of the trailer is carried by a draw bar attached to the rear axle of the vehicle, whereby the load of the trailer is carried directly by the rear axle instead of by the springs.

Another object of this invention is to provide a trailer hitch that can be easily coupled and uncoupled.

A further object of the invention is to provide a trailer hitch that is provided with a telescopic tongue having a coupler plate at its front end that is received in a slot in a draw bar attached to the rear axle of the motor vehicle, and which automatically turns to a coupled position when the vehicle is backed up to the trailer.

A still further object of the invention is to provide a trailer hitch, such as set forth in the preceding objects, that is provided with a fifth wheel bolster.

Other objects of the invention will be apparent to those of ordinary skill in the art to which the invention pertains, from the following description and drawings.

In the drawings:

Figure 1 is a top plan view of the trailer hitch embodying a form of the invention, shown coupled to the rear end of a motor vehicle, the motor vehicle being only partially illustrated;

Fig. 2 is a top plan view of the trailer hitch, a part of the bolster being removed;

Fig. 3 is a view in side elevation of the trailer hitch;

Fig. 4 is a view of the rear end of the trailer hitch;

Fig. 5 is a fragmentary view in side elevation of the forward end of a trailer, and the rear end of the hitch;

Fig. 6 is a view in section of a part of the trailer hitch tongue, showing the arrangement which automatically turns the tongue to a coupled position;

Fig. 7 is a view in section taken on line VII—VII of Fig. 1; and

Fig. 8 is a view of a modified form of bolster for the trailer hitch.

As illustrated in Fig. 1, the trailer hitch comprises a tongue 1 and a draw bar 2. The draw bar 2 comprises an inverted channel having, at the ends thereof, L-shaped plates 3 and 4. The plates 3 and 4 extend under the axle 5 of the vehicle, and are secured in place by the U bolts 6, which are ordinarily provided to clamp the springs 7 of the vehicle to the rear axle.

The tongue comprises a tubular member 9, having secured at the rear end thereof a pair of members 10 and 11, which are so shaped that, when attached to member 9, the rear part of the tongue is of Y shape. The members 10 and 11 of the tongue may be of channel iron or bar construction, and attached to the tubular member 9, as by welding in the manner indicated in the drawings.

The forward part of the tongue comprises a tubular member 12, of heavy walled tubing, that telescopes into the main tongue member 9. The forward end of member 12 is slotted to receive a coupling member 13. The coupling member 13, where it extends into the slot in member 12, is secured to the member as by welding. The forward end of the coupling member 13 is provided with a coupling member or disk 15 of substantially circular form. That part of the coupling member 13 between the disk 15 and the adjacent end of member 12, is relatively narrow so as to form a neck portion 13'. Disk 15 connects the tongue to the bolster 2.

The bolster may be formed in various ways to facilitate coupling of the tongue disk 15 thereto. For example, as shown in Figs. 1, 2, and 3, the rearmost flange of the bolster 2 is provided with a hollow member 16 of approximately spherical shape. Member 16 is welded to the bolster as shown, and provided with an oblong, substantially horizontal slot 16' in the rear thereof, through which the coupler disk 15 may be passed when coupling or uncoupling the hitch. The width of slot 16' is slightly greater than the diameter of the disk 15, and the height of the slot is slightly greater than the thickness of the disk, and width of the neck portion 13' of member 13. After the disk has been inserted through the slot 16' in draw bar 2, the tubular member 12 may be rotated to a position where the disk spans the slot 16' and couples the tongue to the draw bar.

Instead of employing a sphere-like member 16, the bolster 2' may be provided with a slot 16'' in the rear flange thereof, for receiving the coupler disk 15, as shown in Fig. 8. The rear flange of bolster 2' may be made sufficiently deep to provide ample room for the disk. Also, the rear flange may be braced by struts S that connect that flange to the forward flange, as shown.

As shown in Fig. 6, the rear end of the tubular member 12 is provided with a cam slot 18. That slot cooperates with a pin 19, that is inserted through one or another of a plurality of holes 20 in member 9. When the tubular member 12 is moved into member 9, the cam slot engages the pin 19, causing the tubular member 12 to turn to the position where the disk 15 is in a vertical position, and crosswise of the slot in the draw bar.

When the tongue has been coupled to the draw bar 2, a bolt or pin 20' may be inserted through members 9 and 12 to secure them together.

As shown in the drawings, a bolster 21 is mounted on the tongue at a point near the crotch of the same. The bolster comprises a bolster plate 22, which is secured to the top of the tongue member 9 at the forward ends of the members 10 and 11. It may be secured to the tongue member 9 and members 10 and 11 by welding or otherwise. Near the outer ends of member 22 are parallel slots 23, the purpose of which is to provide adjustment of the position of the bolster on the tongue, as will be explained infra.

The bolster also includes a plate 24 which is mounted on a plate 22. The bolster also includes a bearing plate 25, having a ball 26 at the center thereof. Bolts 27 and 28 extend through the slots 23, the bolster plate 24, bearing plate 25, to a point above the same. Coil springs 29 are disposed between the bearing plate 24 and the bolster plate 22, and coil springs 30 are disposed between the upper ends of the bolts 27 and 28 and the top face of the bearing member 25. The upper ends of the springs 30 may be provided with flanged cups or bearing plates 31, which serve as retainers for the springs, and washers for nuts 32 threaded on the upper ends of these bolts. By adjusting the nuts, the initial tension in springs 29 and 30 may be adjusted as required.

As may be seen in the drawings, the bolts 27 and 28 extend through the slots 23, thereby making it possible to shift plate 24, the coil springs and plate 25 along the tongue to adjust the position of ball 26 to the length of the member on the trailer that engages the ball 26.

The rear ends of members 10 and 11 are provided with U-shaped members 34, each having a depending flange 35, that are secured to the rear ends of members 10 and 11. The U-shaped members function as clevises, and may be adjustably secured to the rear end of members 10 and 11 by means of a transverse threaded rod 36. The clevises receive frame members 37 (only one of which is shown) at the forward end of the trailer, as shown in Fig. 5. Since the frame members of trailers of various makes are not necessarily of standard size, the clevises may be provided with adapters 39 which are placed in the bottom of the clevis, and provided with bolts 40 which may be used to jack the trailer members upwardly into engagement with the retaining bolts 42, extending through the upper ends of the clevises. The upper ends of the clevises may be provided with several pairs of holes to further aid in attaching the hitch to trailers where the structural members may vary in size.

In practice, the trailer hitch comprising the members 10, 11 and member 9, is attached to the trailer at the forward end thereof. The goose neck or member 43 of the trailer extends forwardly, and is coupled to the ball member 26 on the bolster. If, when it is decided to move the trailer, and it is to be coupled to a motor vehicle, such as a passenger car, the pin 20' in the tongue is removed so that the tongue member 12 can be pulled forwardly and the disk 15 inserted in the slot 16' in the draw bar 2. Then, by backing the car, member 12 is pushed into member 9 until the cam slot 18 engages the pin 19, causing tubular member 12 and its disk 15 to rotate 90°, whereupon the tongue is coupled to the draw bar 2. When coupled, the stay pin 20' is inserted, thereby securing tubular member 12 to tongue member 9.

When the hitch is coupled, the forward end of the trailer is mounted on a double-acting spring bolster which stabilizes the riding qualities of the trailer and minimizes whipping on the road.

From the foregoing description, it will be apparent to those skilled in this particular art, that various modifications and changes may be made in the illustrated embodiment, without departing from either the spirit or the scope of the invention.

Therefore, what I claim as new and desire to secure by Letters Patent is:

1. A hitch for coupling a trailer to a motor vehicle comprising a drawbar adapted to be secured to the rear axle of the vehicle, said bar having a slot therein at about the center of the same, a tongue having a hollow member and diverging members at the rear thereof for attachment to the frame of such trailer, said hollow member having a pin extending therethrough at a point to the rear of the front end thereof, a tubular member telescoping into said hollow member from the front thereof, said tubular member having a disk at the forward end adapted to be received in the drawbar slot, said tubular member when turned approximately 90°, placing the disk crosswise of the slot, thereby coupling the tongue to the drawbar, the rear end of the tubular member having cam slots which when they engage said pin in response to movement of the telescoping member into said tongue causes the tubular member to turn and position the coupling disk in coupled position with the drawbar, means for securing the tubular member to the hollow member, and a bolster located over said hollow member and secured to the rear portion of the tongue for supporting the forward end of the trailer body on the tongue.

2. A hitch for coupling a trailer to a motor vehicle comprising a drawbar adapted for direct mounting on the rear axle of the vehicle, a slot in said drawbar, a tongue having diverging arms at the rear end adapted to be secured to the front of the trailer frame, said tongue having a member at its forward end which is slidably telescoped within the tongue, and provided with a coupling disk adapted to be received in the drawbar slot, and, when turned, spanning the slot and coupling the tongue to the drawbar, said slidably telescoped member and said tongue being provided with cooperating means for automatically turning the disk to coupled position when the vehicle is backed toward the trailer with the disk in the drawbar slot and said cooperating means are brought into operative relation to turn said slidably telescoped member.

References Cited in the file of this patent
UNITED STATES PATENTS

| | | |
|---|---|---|
| 2,238,095 | Almcrantz | Apr. 15, 1941 |
| 2,255,624 | Luse | Sept. 9, 1941 |
| 2,320,046 | Notar | May 25, 1943 |
| 2,459,965 | Robertson | Jan. 25, 1949 |
| 2,486,605 | Ladd | Nov. 1, 1949 |